UNITED STATES PATENT OFFICE.

ARON ECKMANN, OF BERNE, SWITZERLAND, ASSIGNOR TO SCHWEIZ. SERUM- UND -IMPFINSTITUT, OF BERNE, SWITZERLAND, A CORPORATION OF SWITZERLAND.

PROCESS OF PRODUCING MERCURO-AMINO COMBINATIONS.

1,347,083.     Specification of Letters Patent.     Patented July 20, 1920.

No Drawing.     Application filed June 29, 1917. Serial No. 177,720.

*To all whom it may concern:*

Be it known that I, ARON ECKMANN, a subject of the Czar of Russia, and residing at Berne, Switzerland, have invented certain new and useful Improved Processes of Producing Mercurous-Amino Combinations, of which the following is a specification.

The present invention relates to a process of producing mercurous - amino - combinations.

It has been found, that 1-phenyl-2.3-dimethyl-4-sulfamino-5-pyrazolon will produce a reaction with mercurous-salts by the forming of mercurous-amino-combinations. The therapeutic effect of this new mercurous-preparation is first-class and moreover the new substances compared with the known mercuric-amino combinations which quickly disintegrate, have the great advantage of unlimited durability. This is a great progress which makes the compounds of this kind useful for therapeutic purposes, because due to their tendency to disintegrate the mercuric - amino combinations could not be used either for therapeutic or other purposes. The new substances also have strong bactericidal and spirillocidal qualities.

*First example.*

30 grams (=463.11 grains troy) of 1-phenyl-2.3 - dimethyl - 4 - sulfamino-5-pyrazolon are dissolved in 1½ liters (=0.3963 American gal.) of water and a mixture of 25 grams (=386 grains troy) of freshly prepared mercurous - sulfate ($Hg_2SO_4$) soaked in a little water are added while stirring. An apparent reaction will immediately take place; the white and heavy mercurous-salt will disappear and will be transformed into a grayish white crystalline substance. After reposing for some hours the liquid is sucked off and the substance washed with water and dried at a low temperature.

The undissolved reaction product contains almost all the mercury while the whole of the sulfuric acid of the mercurous-sulfate is to be found in the solution (reaction with chlorid of barium).

If a sample of the undissolved reaction product is suspended in water and if some sodium hydrate is added a part of the mercury will be precipitated and a part will remain dissolved. The mercurous-amino-combination has changed into a mercuric-amino-combination under the influence of the alkali and while precipitating metallic mercury. In order to prove the presence of mercury in the newly formed mercuric-amino-combination the substance is acidulated with hydrochloric acid and precipitated with sulfureted hydrogen.

The mercurous-amino-combination contains about 40 per cent. of mercury.

*Second example.*

With the quantity mentioned in the first example of 1-phenyl-2.3-dimethyl-4-sulfamino-5-pyrazolon the double quantity or 50 grams of freshly prepared mercurous-sulfate are taken and treated as in the first example.

The product thus obtained is a complex combination consisting of the combination as described in the first example and of mercurous-sulfate as shown by the following facts:

The undissolved reaction product contains almost the whole of the mercury. The sulfuric acid of the mercurous-sulfate is partly in the solution and partly in the undissolved reaction product.

By means of an alkali a mixture of metallic mercury and of black mercurous oxid ($Hg_2O$) is precipitated from the above named undissolved reaction product suspended in water. In an acidulated solution sulfureted hydrogen will precipitate the mercury from the mercuric-amino-combination produced by the alkali. The metallic mercury as in the first example is due to the transformation of the mercurous-combination into a mercuric-combination, while the black mercurous oxid is derived from the second component of the complex combination, to wit, from the mercurous-sulfate.

The combination contains about 54 per cent. of mercury.

Both substances contained in the first and in the second example are grayish white, are soluble with difficulty in water, or in the other common solvents, but are soluble in warm concentrated sulfuric acid. The substances have no melting point, but if heated they will begin to blacken and to puff up.

The same conditions will exist if the mercurous-sulfate is changed to mercurous-nitrate, only that in the latter case, of course, nitric acid takes the place of sulfuric acid.

I claim:—

Process of producing mercurous-amino combinations and the complex salts thereof which consists in subjecting 1-phenyl-2.3 dimethyl-4-sulfamino-5-pyrazolon to the action of at least one molecular proportion of a mercurous salt.

In testimony whereof I affix my signature in the presence of two witnesses.

Dr. A. ECKMANN.

Witnesses:
 FRIEDRICH NASGSKI,
 FRIEDRICH MONINGS.